Inventors:
FERDINAND ANTON ERNST PORSCHE
WOLFGANG EYB

BY Craig & Antonelli
ATTORNEYS

United States Patent Office 3,521,721
Patented July 28, 1970

3,521,721
WATER-COOLED ENGINE ARRANGEMENT FOR PASSENGER VEHICLE
Ferdinand Anton Ernst Porsche, Stuttgart-Nord, and Wolfgang Eyb, Leonberg Wurttemberg, Germany, assignors to Firma Dr.-Ing. h.c.F. Porsche KG, Stuttgart-Zuffenhausen, Germany
Filed May 27, 1968, Ser. No. 732,251
Claims priority, application Germany, June 15, 1967, 1,630,936
Int. Cl. B60k 5/02, 11/04
U.S. Cl. 180—54      10 Claims

ABSTRACT OF THE DISCLOSURE

A flat head rear drive engine has a single row of horizontal cylinders extending only on one side of the crankshaft axis, which is centrally aligned with the driving direction; the liquid-air heat exchanger is on the other side of the crankshaft at about the height of the row of cylinders. The drive unit, comprising the engine, transmission and differential, is substantially enclosed by cross and horizontal frame members rigidly connected with a hood concavely downward that forms the bottom of the rear storage compartment and the floor underneath the rear seats. The frame has two rearwardly extending cantilevered arms, with the fuel tank provided therebetween directly rearward of the driving unit.

BACKGROUND OF THE INVENTION

It has been known to provide passenger automotive vehicles with front and rear baggage storage compartments bordering on a passenger compartment within the wheelbase. Such a vehicle has generally been unsatisfactory in that it has been extremely difficult to provide sufficiently large baggage storage compartments on both sides of the passenger compartment while simultaneously reducing the tail heaviness of the vehicle. In a known rear-engine drive vehicle, a water-cooled flat engine has been mounted behind the rear axle underneath a baggage compartment floor; the radiator or heat exchange assembly necessary for cooling the engine being accommodated in the front end of the vehicle (British Pat. No. 959,561). With such an arrangement, the front baggage storage compartment is considerably reduced in space and at the same time this arrangement is unsuitable for compact cars, because considerable expenses are involved with respect to the construction of the cooling heat exchanger.

Vehicles of the above type are extremely sensitive to changes in load, that is, the driving characteristics are dependent to a considerable extent on the load carried and the weight distribution of this load, because of the overhanging masses of the drive assembly. These disadvantages are extensively avoided by arranging the drive assembly within the wheel base of the vehicle. It is known to provide an internal combustion engine with mutually opposed rows of cylinders disposed underneath the rear seats, so that utilizable spaces for the accommodation of baggage remain at the front and the rear ends (U.S. Pat. 2,237,369). However, there is no solution to the most difficult problem inherent in this type of drive assembly, namely the manner in which the engine may be cooled at an expense economically justifiable, particularly with respect to compact vehicles. Although it would be simple to cool the engine directly by air, air cooling is inherently associated with a high noise level and thus cannot be successfully employed in the immediate zone of the passenger compartment.

SUMMARY OF THE INVENTION

In contrast to the above known disadvantageous contructions, the present invention provides a drive assembly arrangement and construction that makes it possible to exploit the advantages of a central engine arrangement for a compact vehicle, with the spatial and financial requirements for cooling the engine restricted to a necessary minimum amount.

This is accomplished in accordance with the present invention by providing the drive assembly, which is disposed within the wheelbase, with a water-cooled flat engine having only a single row of horizontal cylinders on one side of the crankshaft axis, which axis is centrally aligned with the direction of driving. A liquid-air heat exchanger for cooling the engine is disposed on the other side of the crankshaft axis, approximately at the height of the row of cylinders. Such an arrangement according to the present invention has the advantage of a favorable space distribution, in a compact drive unit, with the mass distribution affording satisfactory driving characteristics, particularly for compact vehicles.

Furthermore, the arrangement of the present invention has the additional advantage that the air flow is quite simple with short paths and correspondingly low flow resistance. These advantages flow from the positioning of the heat exchanger blower closely adjacent to the corresponding side of the vehicle and connected with a cooling air passage having an inlet aperture in the side of the vehicle disposed above the floor of the vehicle, despite the fact that the cooling heat exchanger is mounted underneath the floor of the vehicle.

Further advantages are gained by providing a serial connection of the internal combustion engine, change-speed gear transmission and differential gear arrangement of the drive unit underneath a planar bottom plate forming the floor of the rear storage compartment and partially forming the floor of the passenger compartment. Advantageously, the axis of rotation of the driven rear wheels, as seen in the driving direction, extends in front of the axis of rotation of the axles drive shaft outputs of the differential gear arrangement.

It is particularly desirable to surround the internal combustion engine and heat exchanger by tubular frame members and provide a downwardly opening hood or plate rigidly secured to the frame members to thereby enclose the engine and heat exchanger for preventing contamination from the road and at the same time provide for the easy removal of the components from underneath the vehicle by partially lifting the vehicles if repairs become necessary. With such an arrangement, the suspension of the drive unit and heat exchanger is safe from damage, particularly by providing two cross frame members substantially beneath the rear seats of the vehicle and rigidly extending between two side longitudinally extending tubular frame members. One of the cross frame members forming the rear mount for a central longitudinally extending channel frame member, with the other cross frame member extending rearwardly in a V-shape underneath the rear baggage storage compartment floor and above the change-speed transmission of the drive unit. With the provision of rigid frame arms extending rearwardly in a cantilevered fashion from the V-shaped cross frame member, a space is provided between the frame arms for the accommodation of additional auxiliary units, for example the fuel tank, which units are protected thereby outside of the wheelbase.

The intake air conduit for providing cooling air to the air blower is preferably connected with a hollow space or chamber in the adjacent sidewall of the vehicle, which chamber is provided with an intake opening. The conduit is preferably provided with a resilient gasket to form a resilient sealed connection with the blower.

BRIEF DESCRIPTION OF THE DRAWING

Further objects, features and advantages of the present invention will become more clear from the following detailed description of a preferred embodiment of the present invention, in connection with the accompanying drawing, wherein.

DETAILED DESCRIPTION OF THE DRAWING

Figure 1:
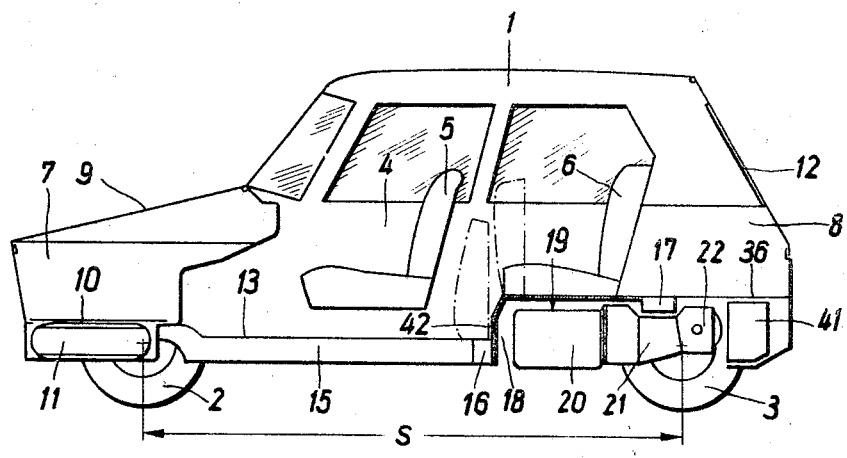
FIG. 1 is a partially schematic side elevation view of a passenger vehicle provided with the drive assembly arrangement according to the present invention, with portions removed.

The passenger motor vehicle, particularly compact car, of the preferred embodiment has a vehicle body 1 provided with steerable front wheels 2 and driven rear wheels 3 defining therebetween the wheelbase S. The passenger compartment 4 has front seats 5 and rear seats 6. To the front and rear, respectively, of the passanger compartment 4 are the storage compartments 7 and 8, particularly for the storage of baggage. The storage compartment 7 is covered by means of a conventional hood 9 and houses, underneath a cover plate 10, a spare tire 11 for the vehicle. Access to the rear storage space 8 is possible through the rear door 12 that is hinged to the roof of the body 1. The passenger compartment 4 and the baggage compartments 7, 8 have a common floor plate 13.

Figure 2:
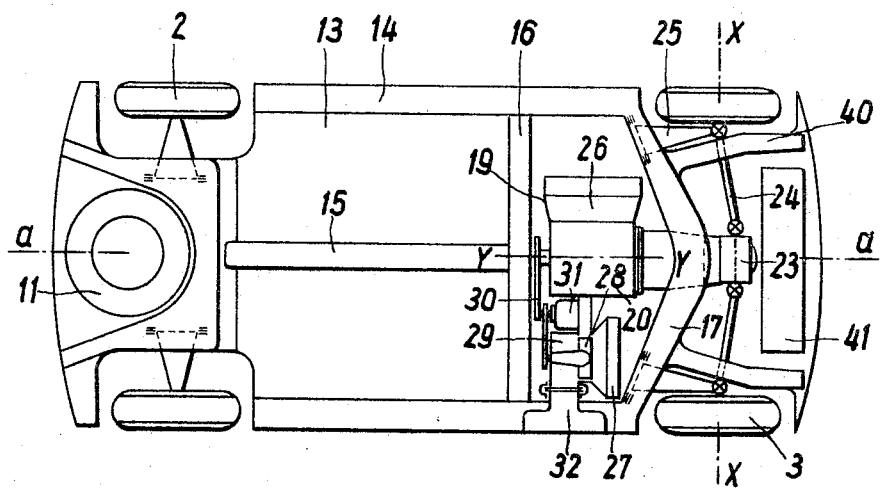
FIG. 2 is a partially schematic top view of the vehicle according to FIG. 1, with the upper vehicle structure removed.
Figure 3:
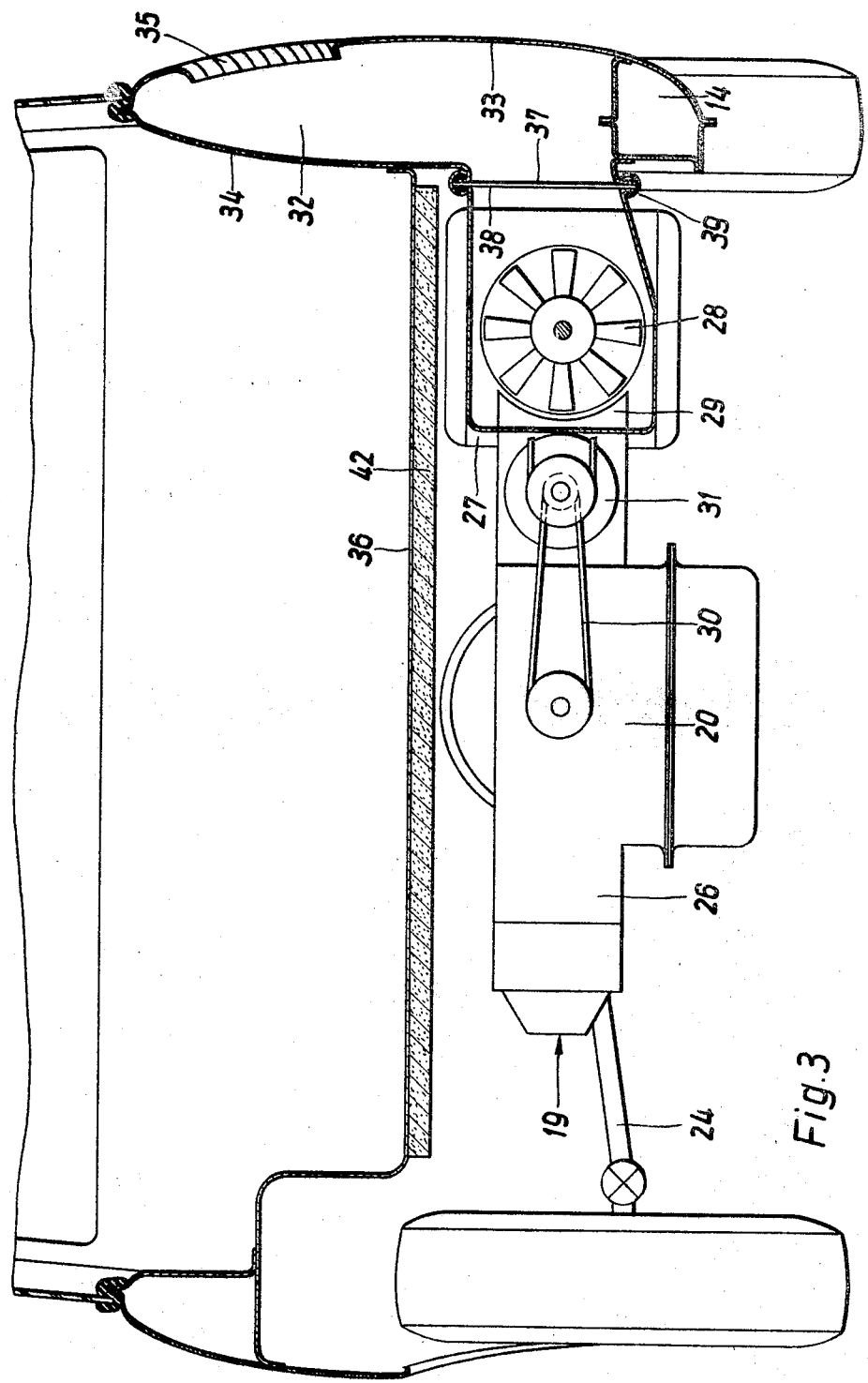
FIG. 3 is a partial cross sectional view transverse to the driving direction looking rearwardly toward the drive unit and heat exchanger.

As most clearly shown in FIG. 2, the vehicle has a rigid frame comprising longitudinal side tubular frame members 14, a central longitudinal channel frame member 15, cross frame members 16, 17 in the rear of the vehicle body 1, and floor plate 13 rigidly secured thereto; all of the frame members are rigidly secured to each other to form a rigid frame unit. Between the cross frame members 16, 17, the bottom plate 13 is curved upwardly and forms a hood or downwardly concave bottom plate 18, which opens toward the road for receiving therein the drive assembly 19.

The drive assembly 19 consists of an internal combustion engine 20, a change-speed gear transmission 21, and a differential gear arrangement 22, all of which are serially arranged in the longitudinal or driving direction of the vehicle. The differential gear arrangement 22 is provided with opposite axle drive shaft outputs 23, which are drivingly connected with respective ones of the rear wheels 3 by means of double jointed half axle shafts 24. The axis of rotation X—X of the rear wheels 3 extends, with respect to the driving direction, in front of the axis of rotation of the axle drive shaft outputs 23. The rear wheels 3 are guided for substantially independent suspension and carried by longitudinal guide members 25, respectively pivotally mounted on opposite sides of the cross frame member 17; the guide members 25 being spring mounted with respect to the frame with suitable springs, for example coil springs (not shown).

The internal combustion engine 20 is a water-cooled flat type engine with only a single horizontal row of cylinders 26 extending beneath the rear seats 6 on only one side of the crankshaft axis Y—Y. The crankshaft axis Y—Y centrally extends in the longitudinal or driving direction a—a of the vehicle. The engine 20 is cooled by means of a liquid-air heat exchanger or radiator 27 that is on the opposite side of the crankshaft axis Y—Y from the row cylinders 26. The heat exchanger 27 includes an axial blower 28 that rotates within an air collecting chamber 29. The axial blower 28 is driven by means of a belt type drive 30 from the crankshaft of the engine. The belt drive 30 also drives an air pump 31 that communicates with the inlet side of the air collecting chamber 29 for pumping air into the exhaust manifold of the engine cylinders for afterburning and purifying the exhaust gases, which air pump 31 is not shown in detail. Air is conducted to the collecting chamber 29 through and by means of a duct or conduit 32 connected to the hollow air space within the sidewall of the vehicle, that is between the outer sidewall 33 and the inner sidewall 34 of the vehicle body 1. The inlet opening 35 providing fresh outside air into the air duct 32 is provided with a suitable grill and located at approximately the waistline or midline of the vehicle body 1, substantially above the planar bottom section 36 of the bottom plate 13.

The bottom section or plate 36 covers the drive assembly 19 and serves selectively as a rear seat foundation or, after the rear seat 6 has been folded toward the front seat, as a loading area or loading platform. The air duct or conduit 32 is provided with a flange 37 adjacent and above the longitudinally extending frame members 14 for connection with a corresponding counterflange 38 of the collecting chamber 29. A suitable resilient gasket or collar 39 is provided between the flanges 37 and 38 to form a resilient sealed connection therebetween. The bottom plate 36 is rigidly reinforced by the tubular cross frame member 17, which extends rearwardly with a V-shape freely over the change-speed transmission 21 of the drive unit 19. The cross frame member 17 has opposite side frame arms 40 extending rearwardly therefrom in a cantilevered manner on each side of the central longitudinal plane a—a of the vehicle. The fuel tank 41 is safely disposed between the frame arms 40 rearwardly of the drive unit 19. The bottom plate 36 is provided with a sound insulating layer 42 within the zone of the internal combustion engine 20, for soundproofing purposes. The drive unit is mounted beneath the bottom or floor plate 13 of the vehicle body 1 by means of the cross frame members 16, 17.

A preferred embodiment of the present invention has been shown for purposes of illustration, with many portions being schematically shown so that the inventive arrangement would not be clouded, which schematic elements may be of otherwise per se conventional construction. Further features, modifications and embodiments are contemplated within the spirit and scope of the present invention as defined by the following claims.

We claim:

1. In a passenger vehicle, having a body with opposite sidewalls; front and rear wheels defining a wheelbase; storage compartments at the front and rear ends bordering on a passenger compartment provided within the wheelbase; a drive unit consisting of an internal combustion engine, a change speed transmission and a differential gear arrangement for driving the rear wheels; said differential gear arrangement having opposite axle drive shaft outputs; double jointed half axles drivingly connecting the rear wheels with the axle drive shaft outputs, respectively, the axis of rotation of the driven rear wheel, as seen in the driving direction, being in front of the axis of rotation of the axle drive shaft outputs of the differential gear arrangement; the drive unit being mounted substantially entirely within the wheelbase; said engine being a water-cooled flat engine with a crank shaft axis extending substantially aligned with the driving direction and substantially centrally of the vehicle; said engine having only a single substantially horizontal row of cylinders on one side of the crank shaft axis;

and a liquid-air heat exchanger means for cooling the engine operatively mounted on the other side of the crank shaft approximately at the height of the row of cylinders.

2. The vehicle according to claim 1, wherein the heat exchanger means has a cooling air passage therethrough, blower means forcing air through said passage and conduit means supplying air to the blower means and opening outwardly through the adjacent sidewall of the vehicle body spaced a substantial distance above the bottom of the adjacent sidewall.

3. The vehicle according to claim 1, wherein the sidewall adjacent to said heat exchanger means has a hollow space therein; an intake opening in said adjacent sidewall providing fluid passage between said hollow space and the exterior of said vehicle body; said heat exchanger means including an air blower and an intake conduit extending from said hollow space to said air blower; a resilient gasket between said intake conduit and said air blower providing a resilient sealed connection therebetween.

4. The vehicle according to claim 1, said body including a planar bottom plate defining the bottom of the rear storage compartment and at least partially defining the bottom of the passenger compartment; the drive unit having serially aligned, in the direction of travel beneath the plate, the change speed transmission and differential gear arrangement.

5. The vehicle according to claim 4, including a vehicle rigid frame comprising at least two longitudinally extending tubular frame members on respective sides of the engine and heat exchanger means, at least two tubular cross-frame members respectively to the front and rear of the engine and heat exchanger means, and a downwardly curved bottom plate rigidly connected to said frame members and covering the engine and the heat exchanger means.

6. The vehicle according to claim 5, including rear passenger seats mounted directly above the internal combustion engine within said passenger compartment; one of said cross-frame members being mounted between the longitudinal frame members; said frame including a central longitudinal frame member rigidly connected at one end to said one cross-frame member; the other one of said cross-frame members extending rearwardly in a V-shape underneath the bottom of the rear storage compartment directly above the change speed transmission.

7. In a passenger vehicle, having a body with opposite sidewalls, front and rear wheels defining a wheelbase, storage compartments at the front and rear ends bordering on a passenger compartment provided within the wheelbase, and a drive unit consisting of an internal combustion engine, a change speed transmission and a differential gear arrangement for driving the rear wheels, the improvement comprising: the drive unit being mounted substantially entirely within the wheelbase; said engine being a water-cooled flat engine with a crank shaft axis extending substantially aligned with the driving direction and substantially centrally of the vehicle; said engine having only a single substantially horizontal row of cylinders on one side of the crank shaft axis; and a liquid-air heat exchanger means for cooling the engine operatively mounted on the other side of the crank shaft approximately at the height of the row of cylinders, including a rigid frame having a cross-frame member extending rearwardly in a substantially V-shape with longitudinal frame arms cantilevered rearwardly on each side of the differential gear arrangement; and a fuel tank being mounted between said arms rearwardly of said drive unit.

8. The vehicle according to claim 7, wherein the sidewall adjacent to said heat exchanger means has a hollow space therein; an intake opening in said adjacent sidewall providing fluid passage between said hollow space and the exterior of said vehicle body; said heat exchanger means including an air blower and an intake conduit extending from said hollow space to said air blower; a resilient gasket between said intake conduit and said air blower providing a resilient sealed connection therebetween.

9. In a passenger vehicle, having a body with opposite sidewalls, front and rear wheels defining a wheelbase, storage compartments at the front and rear ends bordering on a passenger compartment provided within the wheelbase, and a drive unit consisting of an internal combustion engine, a change speed transmission and a differential gear arrangement for driving the rear wheels, the improvement comprising: the drive unit being mounted substantially entirely within the wheelbase; said engine being a water-cooled flat engine with a crank shaft axis extending substantially aligned with the driving direction and substantially centrally of the vehicle; said engine having only a single substantially horizontal row of cylinders on one side of the crank shaft axis; and a liquid-air heat exchanger means for cooling the engine operatively mounted on the other side of the crank shaft approximately at the height of the row of cylinders, including a vehicle rigid frame comprising at least two longitudinally extending tubular frame members on respective sides of the engine and heat exchanger means, at least two tubular cross-frame members respectively to the front and rear of the engine and heat exchanger means, and a downwardly curved bottom plate rigidly connected to said frame members and covering the engine and the heat exchanger means.

10. The vehicle according to claim 9, including rear passenger seats mounted directly above the internal combustion engine within said passenger compartment; one of said cross-frame members being mounted between the longitudinal frame members; said frame including a central longitudinal frame member rigidly connected at one end to said one cross-frame member; the other one of said cross-frame members extending rearwardly in a V-shape underneath the bottom of the rear storage compartment directly above the change speed transmission.

References Cited

UNITED STATES PATENTS

| 1,934,191 | 11/1933 | Hoffman. | |
| 2,165,795 | 7/1939 | Holmstrom | 180—54 |
| 2,237,369 | 4/1941 | Seyerle. | |
| 2,822,056 | 2/1958 | Muller. | |
| 2,900,035 | 8/1959 | Porsche et al. | 180—57 |
| 2,938,591 | 5/1960 | Porsche. | |
| 3,011,577 | 12/1961 | Komenda. | |

FOREIGN PATENTS

| 1,352,914 | 1/1964 | France. |
| 999,227 | 7/1965 | Great Britain. |
| 1,112,480 | 5/1968 | Great Britain. |

BENJAMIN HERSH, Primary Examiner

M. L. SMITH, Assistant Examiner